United States Patent
Vaithyalingam et al.

(10) Patent No.: US 12,314,268 B1
(45) Date of Patent: May 27, 2025

(54) SEMANTIC MATCHING MODEL FOR DATA DE-DUPLICATION OR MASTER DATA MANAGEMENT

(71) Applicant: INTERNATIONAL BUSINESS MACHINES CORPORATION, Armonk, NY (US)

(72) Inventors: Balakumaran Vaithyalingam, Frisco, TX (US); Abhishek Seth, Deoband (IN); Trent A. Gray-Donald, Ottawa (CA); Soma Shekar Naganna, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/593,057

(22) Filed: Mar. 1, 2024

(51) Int. Cl.
*G06F 16/00* (2019.01)
*G06F 16/2457* (2019.01)

(52) U.S. Cl.
CPC .............................. *G06F 16/24573* (2019.01)

(58) Field of Classification Search
None
See application file for complete search history.

(56) References Cited

U.S. PATENT DOCUMENTS

| | | | |
|---|---|---|---|
| 8,595,269 B2 | 11/2013 | Farcasiu et al. | |
| 9,582,660 B1 | 2/2017 | Drinfeld et al. | |
| 9,678,835 B2 * | 6/2017 | Hazlewood | G06F 16/2358 |
| 11,275,727 B2 * | 3/2022 | Oberhofer | G06F 16/24578 |
| 11,681,689 B2 * | 6/2023 | Seth | G06F 16/2379 |
| | | | 707/703 |
| 2010/0005057 A1 * | 1/2010 | Bayliss | G06F 16/24 |
| | | | 707/E17.054 |
| 2014/0115013 A1 * | 4/2014 | Anderson | G06F 16/215 |
| | | | 707/812 |
| 2016/0283541 A1 | 9/2016 | Iyer et al. | |

FOREIGN PATENT DOCUMENTS

CN 112364046 A 10/2020

OTHER PUBLICATIONS

Anonymously, "Customer Master Data Management Software", https://www.posidex.com/platform/customer-master-data-management/, Posidex, Accessed Sep. 15, 2023, 9 pages.

Anonymously, "Method and System for Handling Suspect Duplicates using Linking Feature in MDMS", https://priorart.ip.com/IPCOM/000242719, IP.com, Published Aug. 6, 2015, 4 pages.

(Continued)

*Primary Examiner* — Anhtai V Tran
(74) *Attorney, Agent, or Firm* — Lily Neff; Andrew D. Wright; Calderon Safran & Wright P.C.

(57) ABSTRACT

A computer-implemented method may include a generating a semantic label based on a frequency of similar values in a data field; and profiling a data source; identifying, based on the profiling, critical data elements (CDEs) and non-CDEs within the data source; auto-persisting the CDEs; matching the CDEs together under the semantic label; establishing virtual objects for the non-CDEs; and joining the CDEs and the virtual objects.

20 Claims, 8 Drawing Sheets

(56) References Cited

OTHER PUBLICATIONS

Sukriti Jaitly, "xEM: Explainable Entity Matching in Customer 360", https://arxiv.org/abs/2212.00342, arXiv, Published Dec. 1, 2022, 5 pages.
Anonymously, "Data concepts in IBM Match 360", https://www.ibm.com/docs/en/cloud-paks/cp-data/4.7.x?topic=data-concepts-in-match-360, IBM.com, Published Jul. 26, 2023, 6 pages.
Anonymously, "Data Virtualization on Cloud Pak for Data", https://www.ibm.com/docs/en/cloud-paks/cp-data/4.0?topic=services-data-virtualization, IBM Documentation, Published Sep. 13, 2023, 2 pages.
Anonymously, "An intelligent data catalog for the AI era", https://www.ibm.com/products/knowledge-catalog, IBM Knowledge Catalog, Accessed Aug. 30, 2023, 8 pages.
Anonymously, "IBM® Match 360 on Cloud Pak for Data", https://www.ibm.com/docs/en/cloud-paks/cp-data/4.0?topic=services-match-360-watson, IBM Documentation, Published Sep. 13, 2023, 2 pages.

* cited by examiner

| DATA CLASSES | | | | | | | |
|---|---|---|---|---|---|---|---|
| | BUSINESS | SSN | ADDRESS | | CITY | STATE | ZIP |
| CUST_id | CUST_NAME | TAX_ID | ADDR_Line1 | ADDR_Line2 | CITY | STATE | ZIP |
| 7590-0001 | Rab Laboratory | 513-60-8658 | 123 Main Street | | Houston | TX | 12345 |
| 7590-0002 | Glass Makers Inc. | 7590-0010 | 124 Main Street | | Tucson | NV | 12346 |
| 7590-0003 | Century Tube Co. | 513-60-8660 | 125 Main Street | TX | Detroit | MI | 12347 |
| 7590-0004 | CPM | 513-60-8661 | 126 Main Street | | Alexandria | VA | 12348 |
| 513-60-8658 | Candela Lighting | 513-60-8662 | 127 Main Street | AZ | Annapolis | MA | 12349 |
| 7590-0006 | MN Inc. | 513-60-8663 | Rab Laboratory | | Minneapolis | MN Inc. | 12350 |
| 7590-0007 | Carlon Industial | 513-60-8664 | 129 Main Street | | Flint | MI | 12351 |
| 7590-0008 | Pearson Group | 513-60-8665 | 130 Main Street | | Flint | MI | 7590-0003 |

FIG. 7

SEMANTIC MATCHING MODEL FOR DATA DE-DUPLICATION OR MASTER DATA MANAGEMENT

BACKGROUND

Aspects of the present invention relate generally to master data management (MDM). MDM methods and systems may use data model-driven approaches to data mapping and data integration processes.

SUMMARY

In a first aspect of the invention, there is a computer-implemented method including: a generating a semantic label based on a first frequency of similar values in a data field; and profiling a data source; identifying, based on the profiling, critical data elements (CDEs) and non-CDEs within the data source; auto-persisting the CDEs; matching the CDEs together under the semantic label; establishing virtual objects for the non-CDEs; and joining the CDEs and the virtual objects.

In another aspect of the invention, there is a computer program product including one or more computer readable storage media having program instructions collectively stored on the one or more computer readable storage media. The program instructions are executable to: generate a semantic label based on a first frequency of similar values in a data field; and profile a data source; identify critical data elements (CDEs) and non-CDEs within the data source; auto-persist the CDEs; match the CDEs together under the semantic label; determine a data quality (DQ) score for the CDEs; adjust suspected duplicate processing (SDP) based on the DQ score; establish virtual objects for the non-CDEs; and join the CDEs and the virtual objects.

In another aspect of the invention, there is a system including a processor set, one or more computer readable storage media, and program instructions collectively stored on the one or more computer readable storage media. The program instructions are executable to: generate a semantic label based on a first frequency of similar values in a data field; and profile a data source; identify critical data elements (CDEs) and non-CDEs within the data source; auto-persist the CDEs; match the CDEs together under the semantic label; determine a data quality (DQ) score for the CDEs; adjust suspected duplicate processing (SDP) based on the DQ score; establish virtual objects for the non-CDEs; and join the CDEs and the virtual objects.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 7 shows an exemplary table of data classification in accordance with aspects of the present invention.

DETAILED DESCRIPTION

Figure 1:
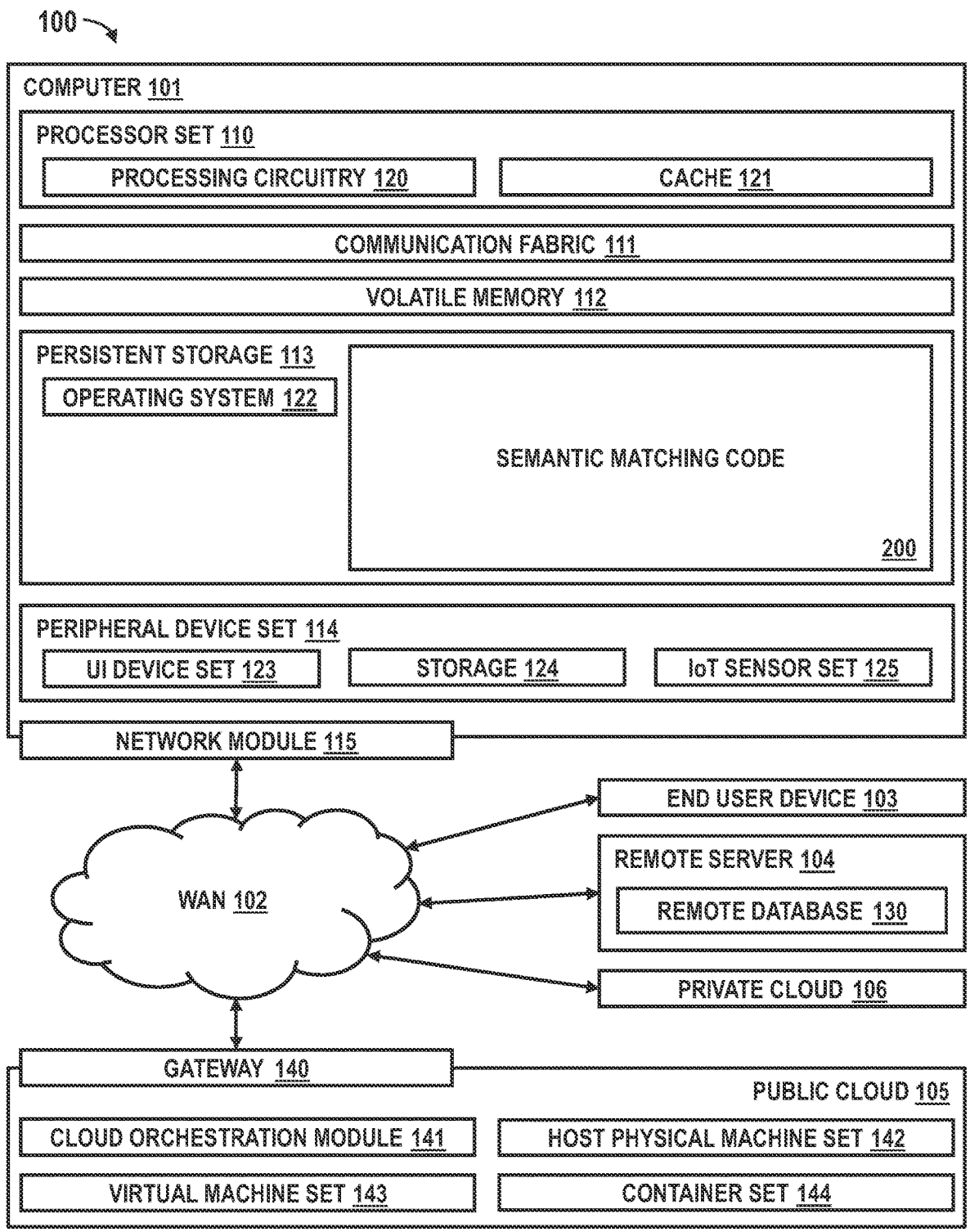
FIG. 1 depicts a computing environment according to an embodiment of the present invention.

Aspects of the present invention relate generally to MDM and, more particularly, to semantic matching modules for MDM or data de-duplication to consolidate data from various customer databases and systems in a single comprehensive view ("360-view"). According to aspects of the invention, the system may include an MDM system with semantic labeling based on suspected duplicate processing (SDP) of data. SDP may include comparing data imported into a data catalog to existing data within a master data catalog to identify suspected data having duplicate details e.g., two or more records belonging to the same customer or entity. SDP may include identifying, matching, associating, and merging existing duplicate data stored across various systems or databases. Duplicate data may be inaccurately matched, including false positives that occur when the system mistakenly links records that should not be matched and false negatives that occur when the system fails to link two records that should have been matched. Critical data elements (CDEs) are elements of information used as criteria for processing searching suspects, matching suspects, suspect categorization adjustment, actions to be taken on suspects found, and decisions around data survivorship. In embodiments, the system may perform data virtualization to provide links between CDEs and non-CDE data elements in the form of virtual objects. In this manner, implementations of the invention orchestrate a 360-view of CDEs and non-CDEs while eliminating complex data models, data mapping, data integration process, duplicate data, and multiple data attribute updates. The system may generate a dynamic matching model based on data discovery, profiling of data, and classification of input data within a data table. Profiling may determine the frequency of different values within a specific class of data and the confidence values of the accuracy of the data. The frequency of values and associated confidence values may be utilized by a semantic matching model to dynamically generate semantic labels. CDEs may be identified by their criticality to a specific purpose and may be grouped by semantic labels.

In embodiments, the system may include generating a dynamic matching model based on the profiling and classification of input attributes or columns. Profiling may include information about the frequencies of different classified values and the confidence around those values. Matching algorithm constructs may be generated dynamically using frequency values and associated confidence values. In embodiments, the system may include dynamic orchestration of 360-views of entities based on the semantic match model, which helps in generating a more representative view of golden master data. Without performing extract, transform, and load (ETL) processing on the input column values, a more appropriate composite view may be generated. The system may provide improved matching quality by leveraging semantic measures instead of hardened or fixed column definition or by transforming or re-ordering input column values under the correct fixed column definition. The system may also adjust weightage given to various matching attributes using data quality and completeness metrics, the overlapping score, and two pre-defined threshold boundaries. In this way, the system creates a semantic match model based on the input of the classification and attribute columns. The system also ensures that the semantic matching model is not fixed by data set fixed column definitions.

The system may import data from data sources into a data catalog module. The data catalog module may function as an inbound data interface and catalog for databases. The data catalog module may profile databases, including an MDM data source, by analyzing data based on accuracy, consistency, and other factors to identify inconsistencies or gaps in data accuracy. Data catalog module may identify CDEs and non-CDEs within an MDM data source by their criticality to a specific purpose i.e., the CDEs contain data relevant to a semantic label.

An SDP module may compare data imported from a data catalog to existing data within the MDM data source to identify suspected data having duplicate details. In embodiments, SDP, performed via an SDP module, may include comparing data imported into a data catalog to existing data within a master data catalog to identify suspected data having duplicate details. SDP may eliminate the need for complex data-cleaning processes as a part of data ingestion and integration from a data catalog module in operable communication with a database. Data having duplicate details may be matched and merged from a data catalog into a master data catalog. As an example, data such as customer name, address, social security number, phone number, and the like, may be compared against existing customer name, address, social security number, and phone number data in a master data catalog. SDP may include matching of data based on pre-identified or generated semantic labels. In embodiments, the system may dynamically update semantic labels based on similarity analysis, such as via cosine similarity calculation. In embodiments, SDP may include determining a duplication score indicative of duplicate data confidence, i.e., the likelihood that data entries are duplicates of one another. The duplication score may be determined based on data statistics and the probabilistic likelihood of the same data. The system may leverage statistical theory and data analysis to establish more accurate links between records with more complex typographical errors and error patterns. This may be computed by comparing CDEs to one another to create a weighted score, i.e., a likelihood ratio, for each pair of records. Records with a higher duplication score will be linked together and records with lower score will be kept separate. Data stewards may configure a threshold value that will determine whether a match or non-match exists.

A semantic label module may identify or generate semantic labels based on profiling a database, including generating a semantic label based on the frequency of similar values in data fields and SDP. For example, a semantic label of "First Name" may be generated based on profiling databases having first names in a variety of data fields relating to first names, regardless of the data field's fixed data column definition. That is, fixed data column definitions may be different, for example, "f_name," "first name," "FN," or the like, which complicates master data management efforts. The semantic label module may match CDEs under a shared semantic label and communicate them to a data stewardship system. The system may establish virtual objects corresponding to non-CDEs and join virtual objects with matched CDEs.

In embodiments, the semantic label module may be configured to match and merge CDEs via a value-based matching algorithm configured to group CDEs by semantic labels via semantic label association. The semantic label module may be configured to generate duplication scores based on data quality (DQ) scores. For example, data with a low DQ score will have a correspondingly low duplication score when compared to data with a high DQ score. DQ scores may be calculated based on user-defined data quality dimensions for each individual column in a data set, which may be used to calculate a combined quality score for an entire data set. Adjustment of weightage given to various matching non-CDEs within a semantic label may be used to adjust DQ score determination.

In embodiments, the system may dynamically generate semantic labels based on the frequency of values in each data field. Semantic labels may be identified for CDEs, which may be user identified or system identified based on frequency. The system may perform data discovery and profiling of MDM data sources, such as databases in operative communication with the system, to identify CDEs and the frequency of different values within a class of CDEs within an MDM system, and the confidence values of the accuracy of the data. CDEs may be autopersisted in the MDM system or in a database. The system may match CDEs based on the frequency of different values within a specific class of data and apply a semantic label to matched CDEs. The system may determine a DQ score for data with a shared semantic label, and adjust SDP based on the DQ score. For example, a low DQ score will indicate low accuracy of semantic matching of data when compared to data with a high DQ score. In a low DQ score scenario, CDE matching may be reduced or may not occur. In a high DQ score scenario, CDE matching may occur with a high degree of confidence. Additionally, SDP may be adjusted based on the DQ score. For example, a low DQ score will reduce SDP accuracy and so SDP may be reduced or may not occur. Virtual objects may be established for non-CDEs without the need to copy or move the non-CDEs to the MDM system. Auto-persisted CDEs and virtual objects may be joined to one another. For example, CDEs relating to an individual's name, address, and social security number may be joined to non-CDEs, such as the identities of databases associated with the CDE. SDP may continue to adjust suspect duplicate identification with individual semantic labels. The DQ score may be combined with duplication score to profile multiple threshold values to determine a match or a non-match of CDEs. For example, if two records have low DQ scores, then the system must have a high degree of confidence, i.e., the duplication score, to consider a match because low DQ score records tend to have missing and irrelevant data and may cause false positives. Similarly. If two records have a high DQ score, then the system does not need a very high duplication score to identify a match of CDEs.

In embodiments, the system may generate virtual tables and 360-views of CDEs and non-CDEs from master data and various connected data sources. Virtual tables and views may be dynamically updated as additional data elements are sourced from databases. In this way, the system may be configured for improved matching and merging of CDEs and non-CDEs by leveraging matching attributes associated with semantic labels instead of fixed table definitions of data.

Existing "model-driven" master data management and mapping of multiple data sources requires complex implementation and data mapping exercises to map attributes and data column definitions from numerous data sources to an MDM model. For example, twelve data sources may have hundreds of attributes, derived attributes, and longitudinal data, which results in thousands of attributes that require mapping. Additionally, inbound data integration processes must be built to perform ETL processing, data quality cleansing, messaging, change data capture, etc. After an initial load is complete, the same processes need to be recreated and adjusted for incremental data processing.

Existing data models and column-name-based SDP using a "model-driven" approach for master data management or customer 360-view solutions fail to correctly identify buried or misplaced data elements. Alternatively, existing data models and column-name-based SDP require pre-processing and pre-cleansing of data to identify and reduce buried or misplaced data elements, i.e., data elements that are incorrectly placed in a wrong table column or location within a data table, which can be costly with respect to time and computing resources. Accordingly, implementing MDM is a multi-year process requiring complex data mapping, complex data integration process, and data copies between multiple source systems & MDM systems. Pre-built data model-driven or custom data model for managing master data and mapping multiple data sources to a one-size fits all approach leads to complex implementation. Additionally, existing data models and column-name-based SDP for MDM create multiple copies of data each requiring real-time updating, which significantly increases computer infrastructure requirements. In embodiments, the disclosed system addresses shortcomings in current MDM systems and provides a technical solution to technical problems by reducing the occurrence of redundant data copies from multiple sources within an MDM system and by reducing misplaced or buried data, thereby reducing the time and computing resource costs of MDM.

Because a data model-driven approach to MDM causes significant complexity, implementations of the disclosed system provide a model-less approach including the ability to build master data management architecture with semantic label-based suspect duplicate processing and data virtualization with a governance framework for highly accurate suspect duplicate processing and highly automated orchestration of customer 360-view. In embodiments, the system may provide a virtualization component that provides a linkage between critical data elements that are used for SDP (persisted data) and remaining attributes (non-CDEs) in the form of virtual objects, thereby facilitating automated orchestration of a 360-degree view and eliminating complex data models, complex data mapping, complex data integration (inbound) processes, data copies, and multiple data attribute updates.

In embodiments, a computer-implemented method may include generating, by a processor set, a semantic label based on a frequency of similar values in a data field; and profiling, by the processor set, a data source; identifying, by the processor set and based on the profiling, critical data elements (CDEs) and non-CDEs within the data source; auto-persisting, by the processor set, the CDEs; matching, by the processor set, the CDEs together under the semantic label; establishing, by the processor set, virtual objects for the non-CDEs; and joining, by the processor set, the CDEs and the virtual objects. Aspects of the present invention improve MDM implementation by reducing complex data mapping and integration between data sources and MDM systems.

In embodiments, a computer-implemented method may include identifying includes identifying a frequency of different values of CDEs under a semantic label. Aspects of the present invention improve the identification of data misplaced or buried within data tables and column headers.

In embodiments, a computer-implemented method may include determining a duplication score based on the frequency of different values of CDEs under a semantic label.

Aspects of the present invention improve the accuracy of identifying matching values within a data source.

In embodiments, a computer-implemented method may include profiling, including determining a confidence value of the CDEs. Aspects of the present invention improve the confidence of identifying CDEs.

In embodiments, a computer-implemented method may include matching based on the confidence value of the CDEs. Aspects of the present invention improve the identification of CDE values in an MDM system.

In embodiments, a computer-implemented method may include generating a composite user interface including the CDEs and the virtual objects. Aspects of the present invention improve user accessibility to viewing CDEs and corresponding virtual objects.

In embodiments, a computer-implemented method may include performing SDP of the CDEs including comparing imported CDE data into a data catalog to existing CDE data within a master data catalog. Aspects of the present invention improve SDP by reducing the likelihood of ignoring lost or buried data from a data source.

In embodiments, a computer-implemented method may include determining a duplication score based on the performing SDP. Aspects of the present invention improve SDP by scoring suspect duplicate data to reduce the complexity of implementing an MDM system.

In embodiments, a computer-implemented method may include matching the CDEs together under the semantic label and does not rely on fixed data column definitions. Aspects of the present invention improve MDM implementation by using a model-less approach that does not rely on table column definitions, thereby reducing lost or buried data.

In embodiments, a computer-implemented method may include matching the CDEs together under the semantic label does not rely on extract, transform, and load processing. Aspects of the present invention improve MDM implementation by generating a more appropriate composite view that is not reliant on input column values.

In embodiments, a computer-implemented method may include determining, by the processor set, a data quality (DQ) score for the CDEs; and adjusting, by the processor set, suspected duplicate processing (SDP) based on the DQ score. Aspects of the present invention improve SDP processing based on a data quality score, thereby reducing complexity of MDM implementation.

In embodiments, a computer program product may include one or more computer readable storage media having program instructions collectively stored on the one or more computer readable storage media, the program instructions executable to generate a semantic label based on a frequency of similar values in a data field; and profile a data source; identify critical data elements (CDEs) and non-CDEs within the data source; auto-persist the CDEs; match the CDEs together under the semantic label; determine a data quality (DQ) score for the CDEs; adjust suspected duplicate processing (SDP) based on the DQ score; establish virtual objects for the non-CDEs; and join the CDEs and the virtual objects. Aspects of the present invention improve MDM implementation by reducing complex data mapping and integration between data sources and MDM systems.

In embodiments, a computer program product may include identifying a frequency of different values of CDEs under a semantic label. Aspects of the present invention improve the identification data misplaced or buried within data tables and column headers.

In embodiments, a computer program product may include determining a duplication score based on the frequency of different values of CDEs under a semantic label. Aspects of the present invention improve the accuracy of identifying matching values within a data source.

In embodiments, a computer program product may include profiling includes determining a confidence value of the CDEs. Aspects of the present invention improve the confidence of identifying CDEs.

In embodiments, a computer program product may include matching occurs based on the confidence value of the CDEs. Aspects of the present invention improve identification of CDE values in an MDM system.

In embodiments, a computer program product may include generating a composite user interface including the CDEs and the virtual objects. Aspects of the present invention improve user accessibility to viewing CDEs and corresponding virtual objects.

In embodiments, a computer program product may include performing SDP of the CDEs including comparing imported CDE data into a data catalog to existing CDE data within a master data catalog. Aspects of the present invention improve SDP by reducing the likelihood of ignoring lost or buried data from a data source.

In embodiments, a computer program product may include matching the CDEs together under the semantic label does not rely on fixed data column definitions. Aspects of the present invention improve MDM implementation by using a model-less approach that does not rely on table column definitions, thereby reducing lost or buried data.

In embodiments, a system may include a processor set, one or more computer readable storage media, and program instructions collectively stored on the one or more computer readable storage media, the program instructions executable to generate a semantic label based on a frequency of similar values in a data field; and profile a data source; identify critical data elements (CDEs) and non-CDEs within the data source; auto-persist the CDEs; match the CDEs together under the semantic label; determine a data quality (DQ) score for the CDEs; adjust suspected duplicate processing (SDP) based on the DQ score; establish virtual objects for the non-CDEs; and join the CDEs and the virtual objects. Aspects of the present invention improve MDM implementation by reducing complex data mapping and integration between data sources and MDM systems.

It should be understood that, to the extent implementations of the invention collect, store, or employ personal information provided by, or obtained from, individuals (for example, social security numbers), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as semantic matching code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
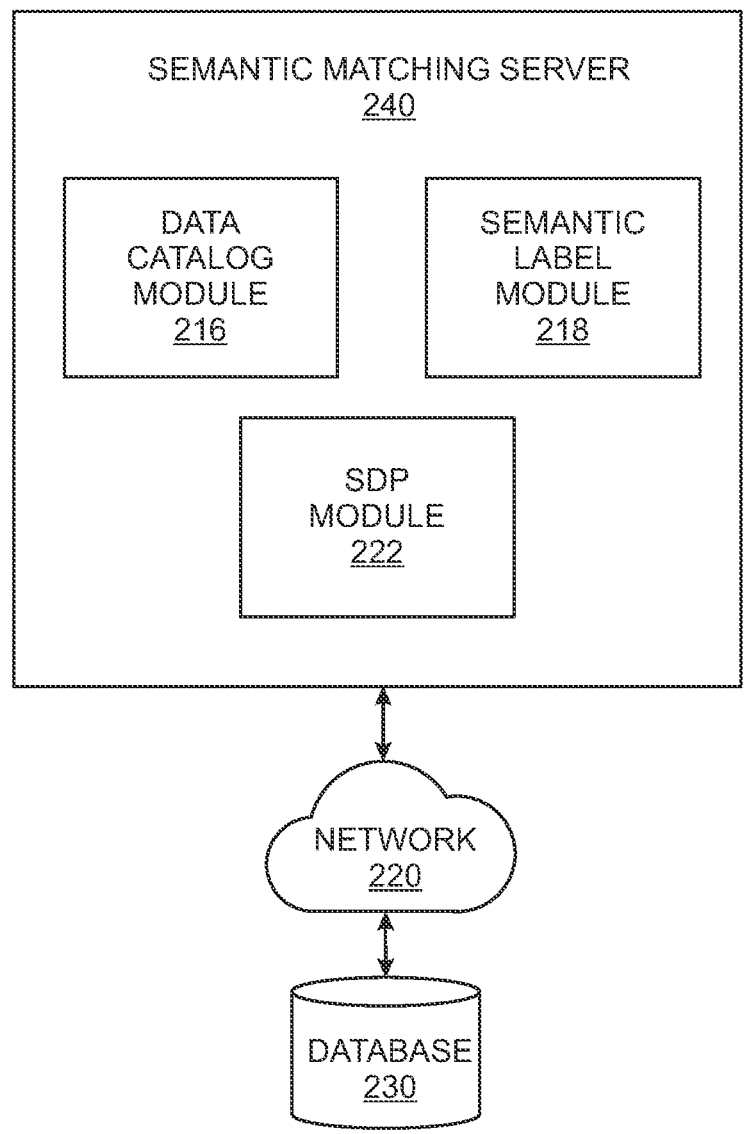
FIG. 2 shows a block diagram of an exemplary environment in accordance with aspects of the present invention.

FIG. 2 shows a block diagram of an exemplary environment 205 in accordance with aspects of the invention. In embodiments, the environment includes semantic matching server 240, corresponding to computer 101 of FIG. 1, including or in operable communication with data catalog module 216, semantic label module 218, and SDP module 222 corresponding to semantic matching code of block 200, as in FIG. 1. The semantic matching server 240 includes or is in communication with the data catalog module 216, semantic label module 218, and SDP module 222 for generating semantic labels, performing SDP and profiling MDM data sources or data catalogs, identifying CDEs, auto-persisting CDEs, performing matching of CDEs under a semantic label, determining DQ scores relating to the CDEs, adjusting SDP techniques, establishing virtual objects for non-CDEs, and joining CDEs and virtual objects. The environment 205 includes at least one database 230 in operable communication with the semantic matching server 240 over network 220, corresponding to WAN 102 of FIG. 1. The database 230, corresponding to remote server 104 or remote database 130 of FIG. 1, may store data imported into the system.

In embodiments, the semantic matching server 240 of FIG. 2 includes data catalog module 216, semantic label module 218, and SDP module 222, each of which may include modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The semantic matching server 240 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

Figure 3:
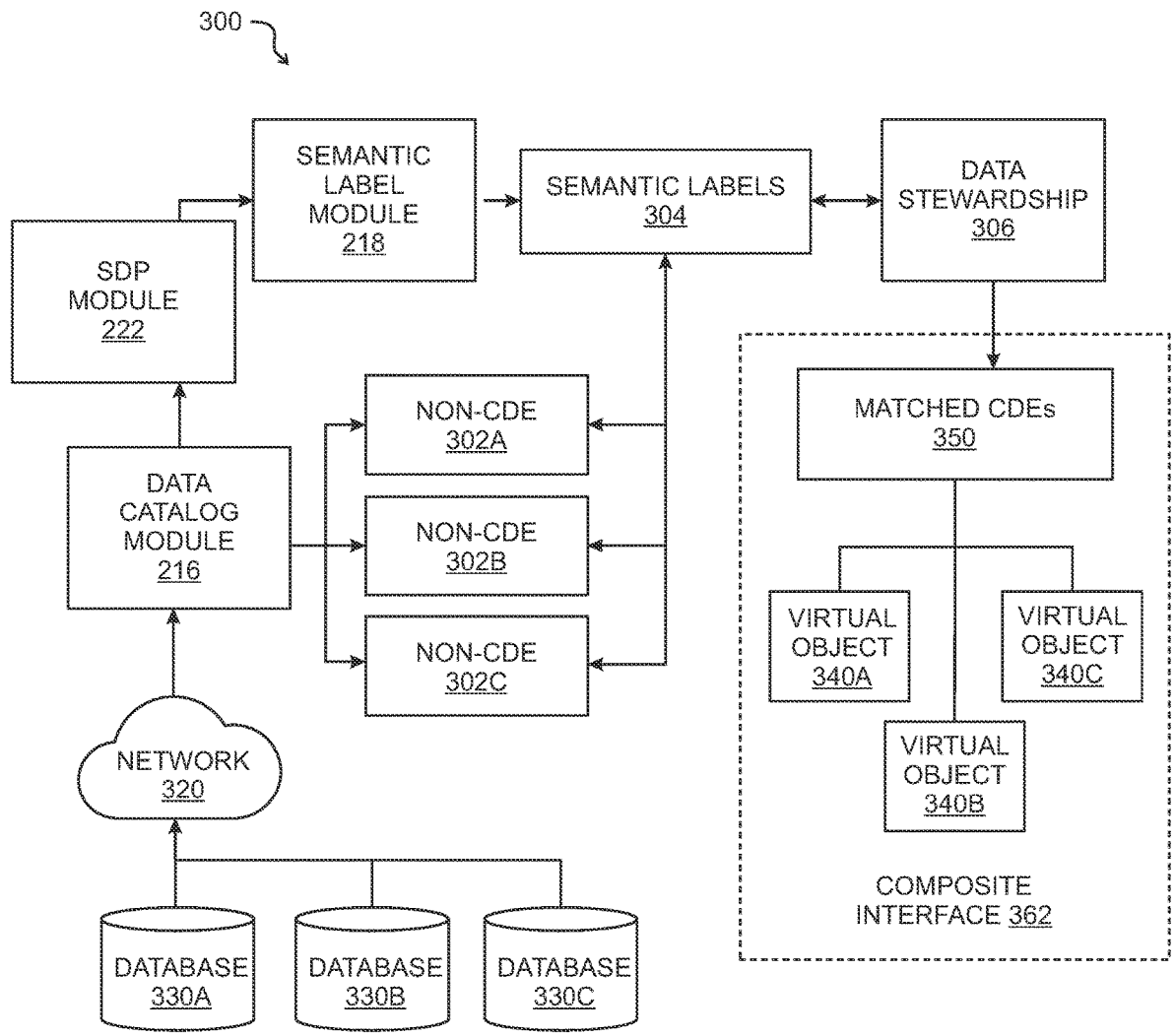
FIG. 3 shows a block diagram of an exemplary environment in accordance with aspects of the present invention.

FIG. 3 shows a flowchart of an exemplary method in accordance with aspects of the present invention. Steps of the method may be carried out in the environment of FIG. 2 and are described with reference to elements depicted in FIG. 2. The system may import data from data sources, such as databases 330A, 330B, and 330C, corresponding to database 230 of FIG. 2, over network 320, corresponding to network 220 of FIG. 2, into the data catalog module 216, depicted in FIGS. 2 and 3. Data catalog module 216 may function as an inbound data interface and catalog for databases 330A, 330B, and 330C. Data catalog module 216 may profile databases, including an MDM data source, by analyzing data based on accuracy, consistency, and other factors to identify inconsistencies or gaps in data accuracy. SDP module 222 may compare data imported from a data catalog to existing data within the MDM data source to identify suspected data having duplicate details. Data catalog module 216 may separate non-CDEs 302A, 302B, and 302C from CDEs. Semantic label module 218 may identify or generate semantic labels 304 based on profiling a database, including generating a semantic label based on frequency of similar values in data fields and SDP. Data profiling may examine data within the database to determine the frequency of different values within a specific class of data and the confidence values of the accuracy of the data. Data profiling may include evaluating data based on accuracy, consistency, and timeliness to determine if the data is lacking accuracy, consistency, or has null or missing values. High-frequency data values having shared features be used to generate a semantic label 304. Data profiling may describe data sets including mean values, minimum/maximum values, and frequency of values. For example, a semantic label of "First Name" may be generated based on profiling databases having first names in a variety of data fields relating to first names, regardless of the data field's fixed data column definition. That is, fixed data column definitions may be different, for example, "f_name," "first name," "FN," or the like, which complicates master data management efforts. Data catalog module 216 may identify CDEs and non-CDEs within an MDM data source by their criticality to a specific purpose i.e., the CDEs contain data relevant to the semantic label 304, rather than identifying CDE's by the fixed data column definition in which they may be located. CDE's may be defined by data rules or a user or organization based on their relevance and support of critical business functions, processes, or goals and may include attributes or features that describe a particular business function, process, or goal. For example, CDEs may include unique identifiers relating to or identifying a customer, business, process, etc. Semantic label module 218 may match CDEs under a shared semantic label 304 and communicate them to a data stewardship 306 system. Matching may include grouping or categorizing CDEs under a shared semantic label 304. The system may establish virtual objects 340A, 340B, and 340C corresponding to non-CDEs 302A, 302B, and 302C. The system may join virtual objects 340A, 340B, and 340C with matched CDEs 350, such as in a dataset or using a unique identifier of the virtual objects 340A, 340B, and 340C and the CDEs 350. Joining of CDEs 350 and virtual objects may be carried out via robotic process automation (RPA) taking into account information parsed from data classes by a recommender system in JavaScript Object Notation (JSON) format within a governance framework. RPA may be used to record metrics for semantic label creation, establish virtual objects 340A, 340B, and 340C for non-CDEs, and auto-perform the joining of virtual objects 340A, 340B, and 340C and the CDEs 350. The recommender system may parse data classes by, for example, collaborative filtering, content filtering, context filtering, or combinations of the same. RPA may be an automation framework where a set of inputs are given to the system, and the system is made to take the action automatically for those inputs. In this context, RPA may be implemented for joining the virtual objects with the CDE persisted objects based on the record number being the unique identifier.

In some embodiments, the system may generate a composite user interface 362 of joined CDEs 350 and virtual objects 340A, 340B, and 340C.

Figure 4:
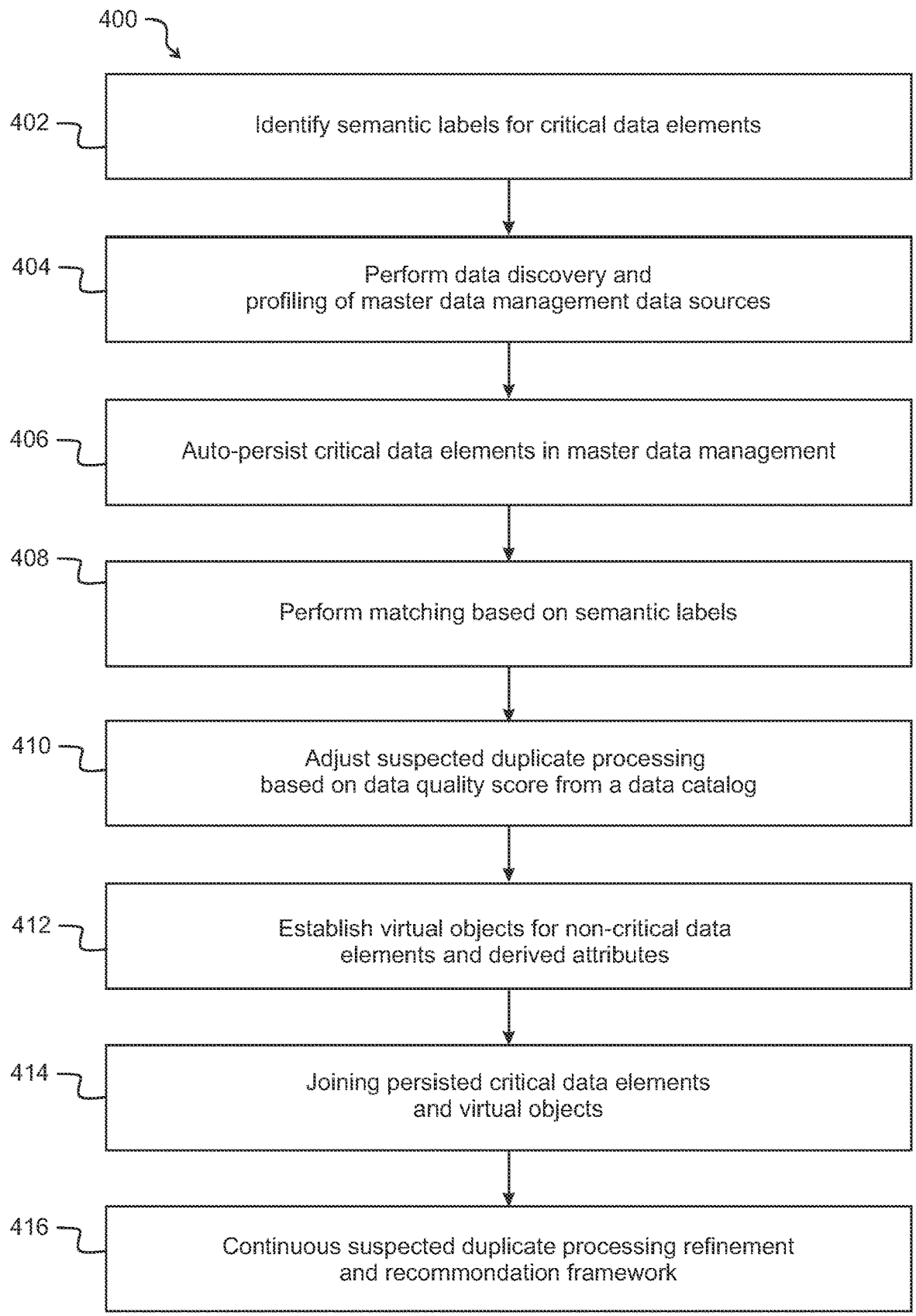
FIG. 4 shows a flowchart of an exemplary method in accordance with aspects of the present invention.

FIG. 4 shows a flowchart of an exemplary method 400 in accordance with aspects of the present invention. Steps of the method may be carried out in the environment of FIGS. 2 and 3. Method 400 may include step 402, which may include identifying semantic labels for CDEs via the semantic label module 218 of FIGS. 2 and 3. Step 404 may include performing data discovery and profiling of MDM data sources via the data catalog module 216 of FIGS. 2 and 3. Step 406 may include auto-persisting CDEs in an MDM system via the data catalog module 216 of FIGS. 2 and 3. Auto-persisting CDEs may include storing CDEs in a database such that they may be retrieved subsequently from non-volatile storage. Step 408 may include performing matching of CDEs based on semantic labels via the semantic label module 218 of FIGS. 2 and 3. Step 410 may include adjusting SDP based on a DQ score from a data catalog via the SDP module 222. Step 412 may include establishing virtual objects for non-CDEs, such as 302A, 302B, and 302C in FIG. 3, via data catalog module 216 of FIGS. 2 and 3. Step 414 may include joining persisted CDEs and virtual objects via semantic label module 218 of FIGS. 2 and 3. Step 416 may include performing continuous SDP refinement of CDEs and non-CDEs, via SDP module 222, imported from databases 330A, 330B, and 330B of FIG. 3 and database 230 of FIG. 2.

Figure 5:
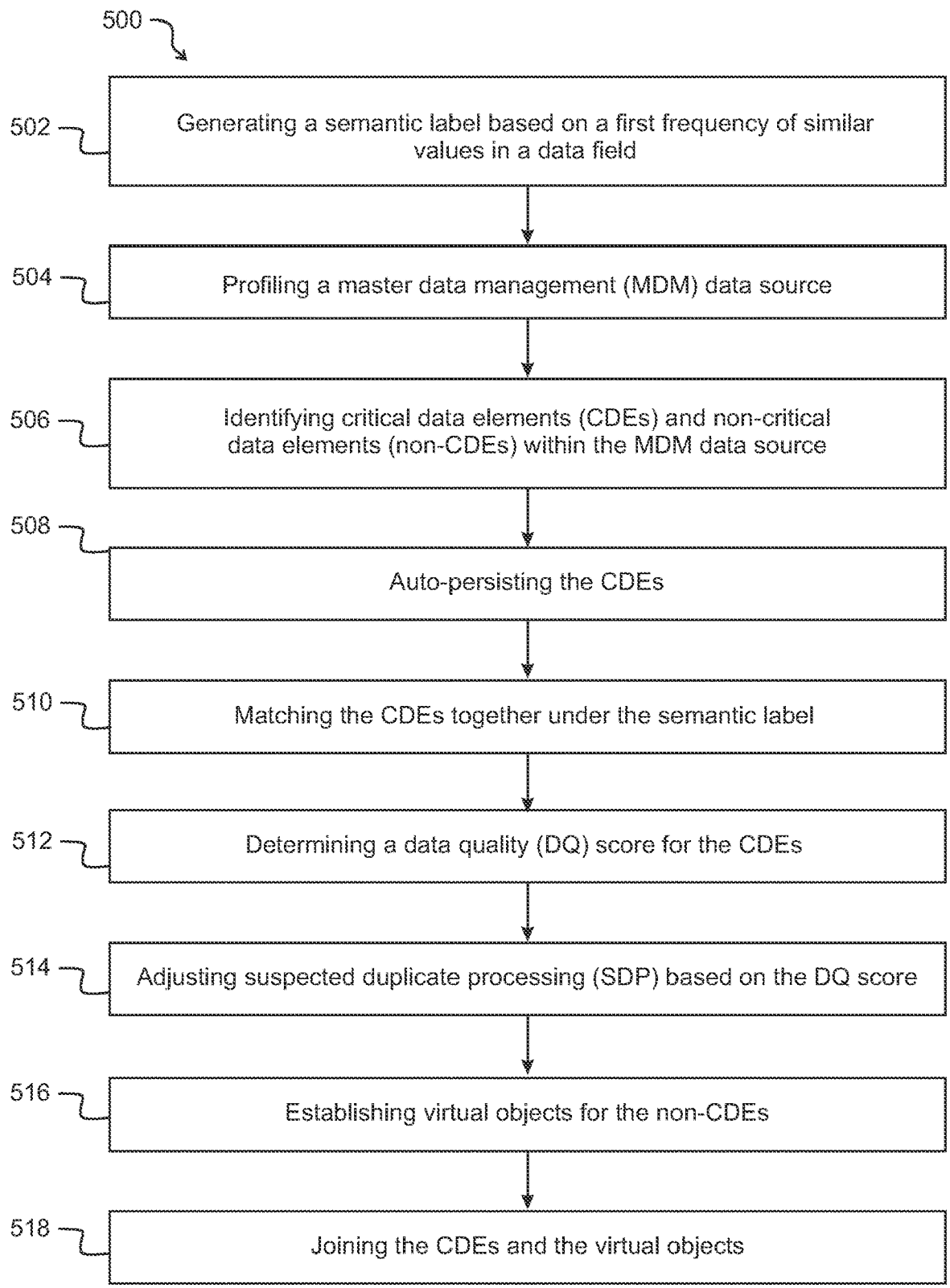
FIG. 5 shows a flowchart of an exemplary method in accordance with aspects of the present invention.

FIG. 5 shows a flowchart of an exemplary method 500 in accordance with aspects of the present invention. Steps of the method may be carried out in the environment of FIGS. 2 and 3. Method 500 may include step 502, which may include generating a semantic label based on a frequency of similar values in a data field via the semantic label module 218 of FIGS. 2 and 3. Step 504 may include profiling an MDM data source via data catalog module 216 of FIGS. 2 and 3. Step 506 may include identifying CDEs and non-CDEs within the MDM source via data catalog module 216 of FIGS. 2 and 3. Step 508 may include auto-persisting CDEs via the data catalog module 216 of FIGS. 2 and 3. Step 510 may include matching CDEs together under a semantic label via semantic label module 218 of FIGS. 2 and 3. Step 512 may include determining a DQ score for the CDEs via the semantic label module 218 of FIGS. 2 and 3. Step 514 may include adjusting SDP based on the DQ score via the SDP module 222 of FIGS. 2 and 3. Step 516 may include establishing virtual objects for non-CDEs via data catalog module 216 of FIGS. 2 and 3. Step 518 may include joining the CDEs and the virtual objects via semantic label module 218 of FIGS. 2 and 3.

Figure 6:
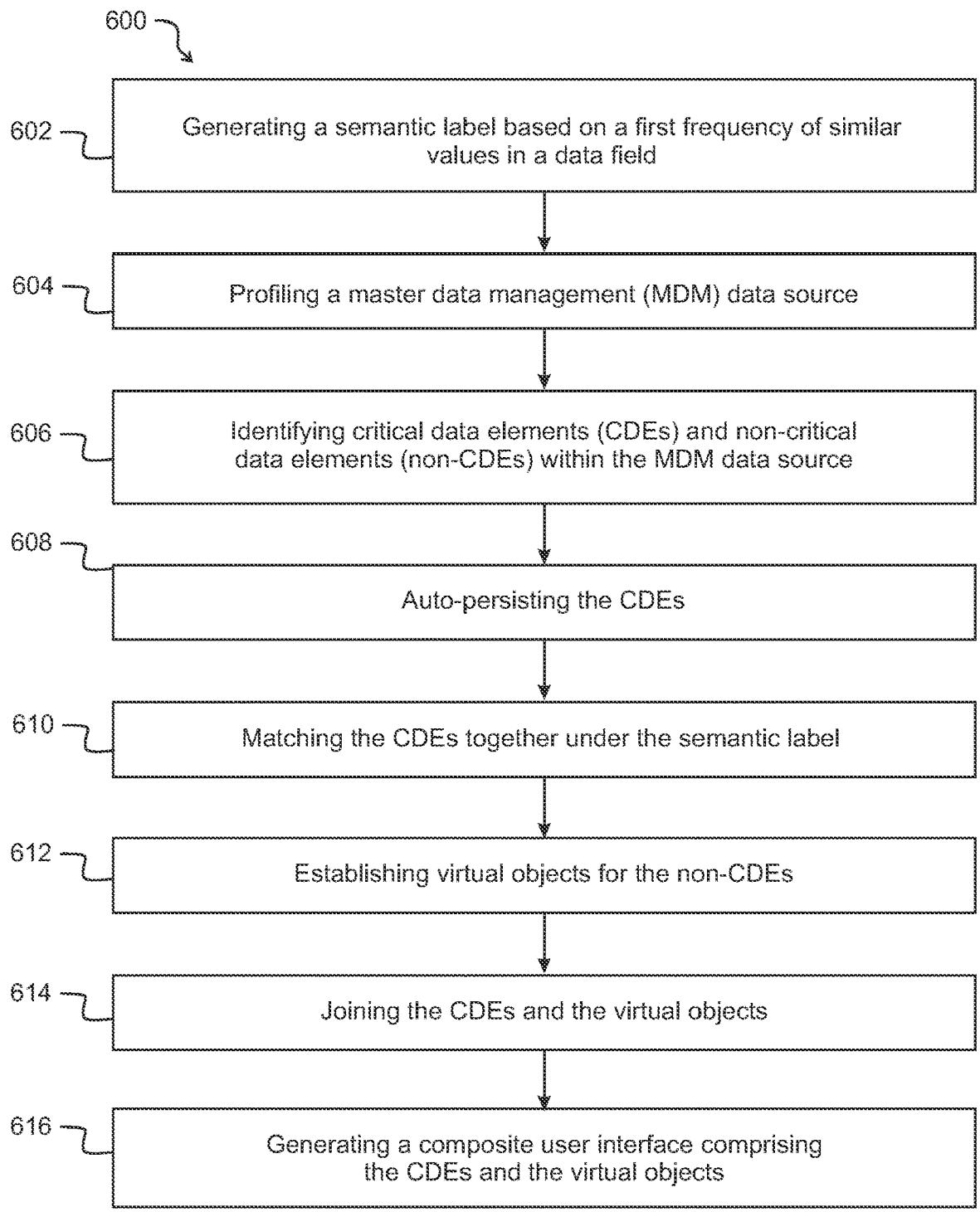
FIG. 6 shows a flowchart of an exemplary method in accordance with aspects of the present invention.

FIG. 6 shows a flowchart of an exemplary method 600 in accordance with aspects of the present invention. Steps of the method may be carried out in the environment of FIGS. 2 and 3. Method 600 may include step 602, which may include generating a semantic label based on a first frequency of similar values in a data field via the semantic label module 218 of FIGS. 2 and 3. Step 604 may include profiling an MDM data source via data catalog module 216 of FIGS. 2 and 3. Step 606 may include identifying CDEs and non-CDEs within the MDM source via data catalog module 216 of FIGS. 2 and 3. Step 608 may include auto-persisting CDEs via the data catalog module 216 of FIGS. 2 and 3. Step 610 may include matching CDEs together under a semantic label via semantic label module 218 of FIGS. 2 and 3. Step 612 may include establishing virtual objects for non-CDEs via data catalog module 216 of FIGS. 2 and 3. Step 614 may include joining the CDEs and the virtual objects via semantic label module 218 of FIGS. 2 and 3. Step 616 may include generating a composite user interface comprising the CDEs and the virtual objects via the semantic matching server 240 of FIG. 2. The composite user interface 362 may be displayed to a user on a device display.

FIG. 7 shows a table of data classification in accordance with aspects of the present invention. Data catalog 706 may include data classes 708 including customer identifications (CUST_id), business information (CUST_NAME), personal identification data (TAX_ID), address information (ADDR_Line1, ADDR_Line2, CITY, STATE, ZIP, etc.) Data classes 708 may include column headers 702 relating to businesses, identification numbers, addresses, and the like. Data entries within the data classes may include relevant customer information but, in many cases, may include data entries incorrectly placed under a particular column header 702. For example, each of data entries 704, 710, 712, 714, 16, and 718 are incorrectly entered under an incorrect column header 702. In embodiments, the system may perform SDP processing, including comparing data imported into a data catalog 706 to existing data within a master data catalog to identify suspected data having duplicate details, i.e., entries 704, 710, 712, 714, 16, and 718. SDP may include identifying, matching, associating, and merging existing duplicate data entries 704, 710, 712, 714, 16, and 718 stored across various systems or databases.

Figure 8:
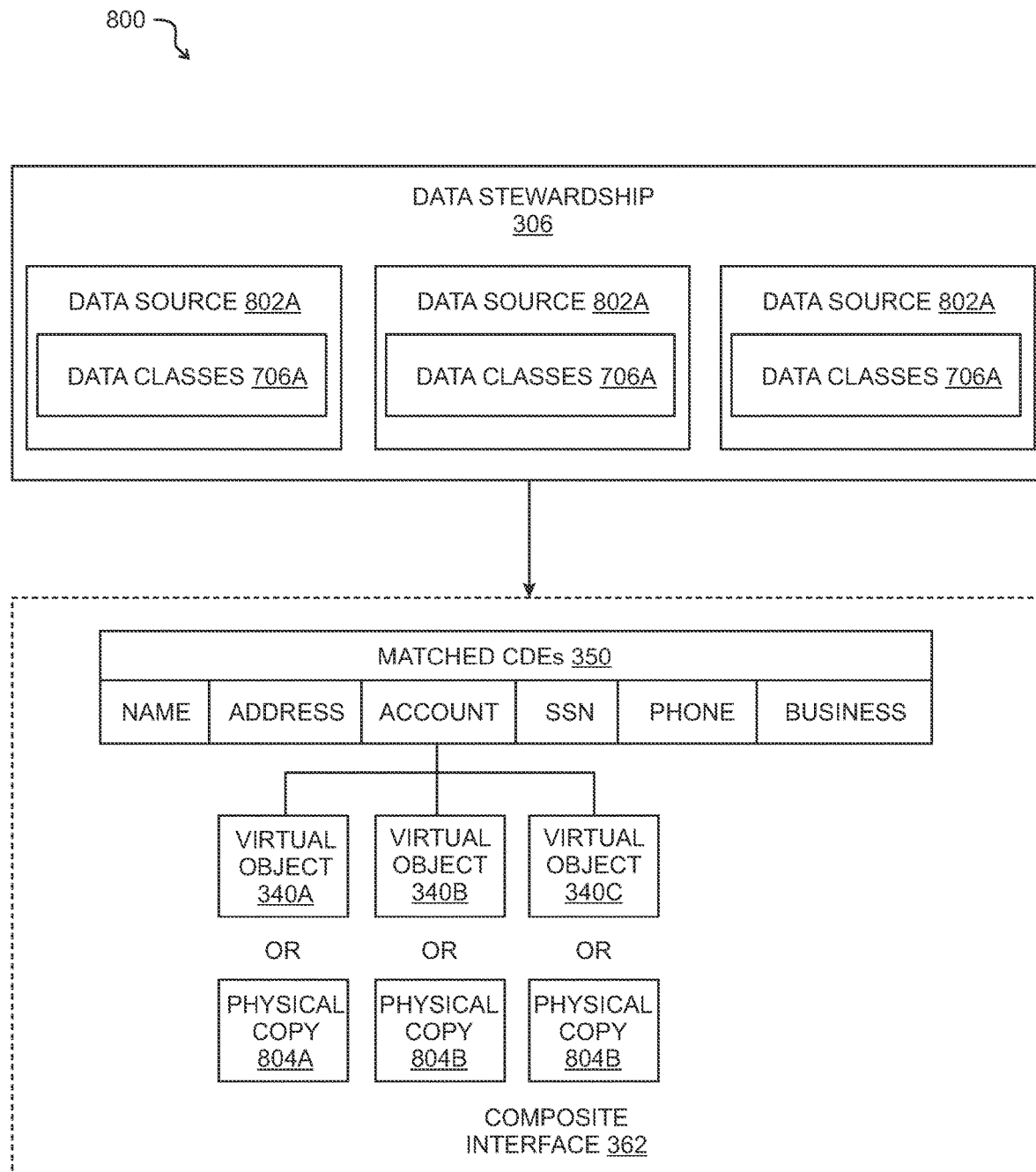
FIG. 8 shows a block diagram of an exemplary environment in accordance with aspects of the present invention.

FIG. 8 shows a block diagram of an exemplary method 800 in accordance with aspects of the present invention. Semantic label module 218 of FIG. 2 may match CDEs 350 under a shared semantic label and communicate them to a data stewardship 306 system. Data stewardship 306 system may communicate data classes 706A, 706B, and 706B from corresponding data sources 802A, 802B, and 802C, corresponding to database 330A, 330B, and 330C of FIG. 3. The system may match CDEs based on the frequency of different values within a specific class of data and apply a semantic label to matched CDEs 350. Matched CDEs 350 are distinct from data classes 708 of FIG. 7. The system may join virtual objects 340A, 340B, and 340C with matched CDEs 350, such as in a dataset or using a unique identifier of the virtual objects 340A, 340B, and 340C and the CDEs 350. Joining of CDEs 350 and virtual objects may be carried out via RPA taking into account information parsed from a recommender system within a governance framework. In some embodiments, the system may generate a composite user interface 362 or user interface elements, of joined CDEs 350 and virtual objects 340A, 340B, and 340C. The composite user interface 362 may be displayed to a user on a device display. In some embodiments, the system may create physical copies 804A, 804B, 804C of virtual objects 340A, 340B, and 340C in a database, such as database 230 of FIG. 2.

In embodiments, a service provider could offer to perform the processes described herein. In this case, the service provider can create, maintain, deploy, support, etc., the computer infrastructure that performs the process steps in accordance with aspects of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, implementations provide a computer-implemented method, via a network. In this case, a computer infrastructure, such as computer 101 of FIG. 1, can be provided and one or more systems for performing the processes in accordance with aspects of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes in accordance with aspects of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
generating, by a processor set, a semantic label based on a first frequency of similar values in a data field; and
profiling, by the processor set, a data source;
identifying, by the processor set and based on the profiling, critical data elements (CDEs) and non-CDEs within the data source;
auto-persisting, by the processor set, the CDEs;
matching, by the processor set, the CDEs together under the semantic label;
establishing, by the processor set, virtual objects for the non-CDEs; and
joining, by the processor set, the CDEs and the virtual objects.

2. The computer-implemented method of claim 1, wherein the identifying comprises identifying a second frequency of different values of the CDEs under the semantic label.

3. The computer-implemented method of claim 2, further comprising determining a duplication score based on the second frequency of the different values of the CDEs under the semantic label.

4. The computer-implemented method of claim 1, wherein the profiling comprises determining a confidence value of the CDEs.

5. The computer-implemented method of claim 4, wherein the matching occurs based on the confidence value of the CDEs.

6. The computer-implemented method of claim 1, further comprising generating a composite user interface comprising the CDEs and the virtual objects.

7. The computer-implemented method of claim 1, further comprising performing suspected duplicate processing (SDP) of the CDEs comprising comparing imported CDE data into a data catalog to existing CDE data within a master data catalog.

8. The computer-implemented method of claim 7, further comprising determining a duplication score based on the performing the SDP.

9. The computer-implemented method of claim 1, wherein the matching the CDEs together under the semantic label does not rely on fixed data column definitions.

10. The computer-implemented method of claim 1, wherein the matching the CDEs together under the semantic label does not rely on extract, transform, and load processing.

11. The computer-implemented method of claim 7, further comprising:
   determining, by the processor set, a data quality (DQ) score for the CDEs; and
   adjusting, by the processor set, the SDP based on the DQ score.

12. A computer program product comprising one or more computer readable storage media having program instructions collectively stored on the one or more computer readable storage media, the program instructions executable to:
   generate a semantic label based on a first frequency of similar values in a data field;
   profile a data source;
   identify critical data elements (CDEs) and non-CDEs within the data source;
   auto-persist the CDEs;
   match the CDEs together under the semantic label;
   determine a data quality (DQ) score for the CDEs;
   adjust suspected duplicate processing (SDP) based on the DQ score;
   establish virtual objects for the non-CDEs; and
   join the CDEs and the virtual objects.

13. The computer program product of claim 12, wherein the identifying comprises identifying a second frequency of different values of the CDEs under the semantic label.

14. The computer program product of claim 13, further comprising determining a duplication score based on the second frequency of the different values of the CDEs under the semantic label.

15. The computer program product of claim 12, wherein the profiling comprises determining a confidence value of the CDEs.

16. The computer program product of claim 15, wherein the matching occurs based on the confidence value of the CDEs.

17. The computer program product of claim 12, wherein the program instructions are executable to generate a composite user interface comprising the CDEs and the virtual objects.

18. The computer program product of claim 12, further comprising performing SDP of the CDEs comprising comparing imported CDE data into a data catalog to existing CDE data within a master data catalog.

19. The computer program product of claim 12, wherein the matching the CDEs together under the semantic label does not rely on fixed data column definitions.

20. A system comprising:
   a processor set, one or more computer readable storage media, and program instructions collectively stored on the one or more computer readable storage media, the program instructions executable to:
   generate a semantic label based on a first frequency of similar values in a data field;
   profile a data source;
   identify critical data elements (CDEs) and non-CDEs within the data source;
   auto-persist the CDEs;
   match the CDEs together under the semantic label;
   determine a data quality (DQ) score for the CDEs;
   adjust suspected duplicate processing (SDP) based on the DQ score;
   establish virtual objects for the non-CDEs; and
   join the CDEs and the virtual objects.

\* \* \* \* \*